United States Patent
Ji et al.

(10) Patent No.: US 12,166,653 B2
(45) Date of Patent: Dec. 10, 2024

(54) METHOD FOR CONFIRMING IN-SITU FLOW INFORMATION TELEMETRY CAPABILITY AND DEVICE

(71) Applicant: Huawei Technologies Co., Ltd., Shenzhen (CN)

(72) Inventors: Yeyi Ji, Nanjing (CN); Fang Xin, Nanjing (CN); Ruixia Li, Nanjing (CN); Feng Xu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/720,864

(22) Filed: Apr. 14, 2022

(65) Prior Publication Data

US 2022/0247655 A1     Aug. 4, 2022

Related U.S. Application Data

(63) Continuation of application No. PCT/CN2020/092709, filed on May 27, 2020.

(30) Foreign Application Priority Data

Oct. 15, 2019    (CN) .......................... 201910979453.6

(51) Int. Cl.
*H04L 43/0829* (2022.01)
*H04L 43/0811* (2022.01)
*H04L 43/10* (2022.01)

(52) U.S. Cl.
CPC ...... *H04L 43/0829* (2013.01); *H04L 43/0811* (2013.01); *H04L 43/10* (2013.01)

(58) Field of Classification Search
CPC . H04L 43/0829; H04L 43/0811; H04L 43/10; H04L 41/0213; H04L 41/12; H04L 43/0817; H04L 43/0852; H04L 43/0847
See application file for complete search history.

(56) References Cited

U.S. PATENT DOCUMENTS

2004/0268118 A1* 12/2004 Bazan Bejarano ..... H04L 63/20 713/151
2005/0135261 A1* 6/2005 Lee ....................... H04L 1/0072 370/241

(Continued)

FOREIGN PATENT DOCUMENTS

CN     105308904 A    2/2016
CN     106487686 A    3/2017

(Continued)

OTHER PUBLICATIONS

H. Song et al. "In-situ Flow Information Telemetry Framework draft-song-opsawg-ifit-framework-03". Jul. 8, 2019. https://datatracker.ietf.org/doc/html/draft-song-opsawg-ifit-framework-03 (Year: 2019).*

(Continued)

*Primary Examiner* — Philip J Chea
*Assistant Examiner* — James Ross Hollister
(74) *Attorney, Agent, or Firm* — Slater Matsil, LLP

(57) ABSTRACT

A first network device sends a request packet to a second network device or a network management device, where the request packet is used to request to confirm whether the second network device has an iFIT capability; and the first network device receives a confirmation packet sent by the second network device or the network management device, where the confirmation packet includes confirmation information used to confirm whether the second network device has the iFIT capability.

17 Claims, 4 Drawing Sheets

(56) References Cited

U.S. PATENT DOCUMENTS

| | | | | |
|---|---|---|---|---|
| 2011/0078237 | A1* | 3/2011 | Nakamura | H04L 41/12 709/224 |
| 2012/0093175 | A1* | 4/2012 | You | H04L 69/04 370/465 |
| 2017/0026269 | A1* | 1/2017 | Liang | H04L 43/18 |
| 2017/0353354 | A1* | 12/2017 | Karapantelakis | H04L 67/104 |
| 2018/0367518 | A1* | 12/2018 | Singh | H04L 63/06 |
| 2019/0268267 | A1* | 8/2019 | Pignataro | H04L 45/741 |
| 2020/0162307 | A1* | 5/2020 | Chen | H04L 65/00 |

FOREIGN PATENT DOCUMENTS

| | | |
|---|---|---|
| CN | 107623642 A | 1/2018 |
| CN | 108737128 A | 11/2018 |
| CN | 109995555 A | 7/2019 |
| EP | 2509261 B1 | 10/2013 |
| EP | 2675123 A1 | 12/2013 |

OTHER PUBLICATIONS

3GPP TR 23.742 V16.0.0 (Dec. 2018), 3rd Generation Partnership Project; Technical Specification Group Services and Systems Aspects; Study on Enhancements to the Service-Based Architecture (Release 16), 131 pages.

Song, H., et al., "Export User Flow Telemetry Data by Postcard Packets", draft-song-ippm-postcard-based-telemtry-00, Oct. 20, 2018, 19 pages.

Song, H. et al., "MPLS Extension Header", draft-song-mpls-extension-header-01, Aug. 8, 2018, 15 pages.

Song, H. et al., "In-situ Flow Information Telemetry Framework", draft-song-opswag-ifit-framework-00, Apr. 25, 2019, 6 pages.

Song, H. et al. "In-situ Flow Information Telemetry Framework", draft-song-opsawg-ifit-framework-00, Oct. 22, 2018, 11 pages.

Wang. Y., "Extensions to OSPF for Advertising In-situ Flow Information Telemetry (IFIT) Node Capability", draft-wang-lsr-ospf-ifit-node-capability-03, Mar. 9, 2020, 8 pages.

Zhou, T. et al., "Enhanced Alternate Marking Method", draft-zhiu-ippm-enhanced-alternate-marking-oo, Oct. 22, 2018, 7 pages.

Chen, E. et al., "Dynamic Capability for BGP-4", Network Working Group, Internet Draft, Dec. 5, 2011, 7 Pages.

Qualcomm Incorporated, "AMF verification of the UE radio capabilities for CP optimization only CIoT UE", 3GPP TSG SA WG3 (Security) Meeting #96-Adhoc, S3-193391, Oct. 14-18, 2019, 2 Pages, Chingqing, China.

Song, H. et al., "In-situ Flow Information Telemetry Framework", OPSAWG, Internet-draft, Intended Status-Informational, Mar. 26, 2019, 6 pages.

Wang, Y. et al., "Extensions to BGP-LS for Advertising In-situ Flow Information Telemetry (IFIT) Node Capability", Interdomain Routing Working Group, Internet-draft, Intended status- Standards Track, Mar. 13, 2020, 7 Pages.

\* cited by examiner

| 0 | 8 | 16 | 31 |
|---|---|---|---|
| Type (Type) | Code (Code) | Checksum (Checksum) | |
| Other... | | | |

METHOD FOR CONFIRMING IN-SITU FLOW INFORMATION TELEMETRY CAPABILITY AND DEVICE

CROSS-REFERENCE TO RELATED APPLICATIONS

This application is a continuation of International Application No. PCT/CN2020/092709, filed on May 27, 2020, which claims priority to Chinese Patent Application No. 201910979453.6, filed on Oct. 15, 2019. The disclosures of the aforementioned applications are hereby incorporated by reference in their entireties.

TECHNICAL FIELD

This application relates to the field of communications technologies, and in particular, to a method for confirming an in-situ flow information telemetry (iFIT) capability of a network device and a device in an iFIT service scenario.

BACKGROUND

By performing feature marking on actual service traffic and based on a field of the feature marking, an iFIT technology can provide end-to-end and hop-by-hop telemetry capabilities for real service traffic, and sense network performance indicators in real time. The iFIT technology herein is an individual draft "In-situ Flow Information Telemetry Framework" submitted to the Internet Engineering Task Force (IETF). For an Internet link to the draft, refer to https://tools.ietf.org/html/draft-song-opsawg-ifit-framework-00. A network based on the iFIT technology includes three types of network nodes, specifically: a head node, an end node, and hop-by-hop path nodes. To simplify configuration and facilitate deployment, static instances that support iFIT are configured only on the head node at present. That is, it is ensured that the head node has an iFIT capability, but it is not ensured that the end node supports iFIT. In this way, after receiving a data packet, an end node having the iFIT capability may automatically identify and remove an iFIT header encapsulated on the head node. However, if the end node does not have the iFIT capability, the end node cannot remove the iFIT header. As a result, the data packet cannot be identified and is considered as an error packet and discarded. A case in which the end node does not have the iFIT capability usually occurs when new and old devices interwork with each other, or when devices from different vendors interwork with each other.

SUMMARY

This application provides a method for confirming an iFIT capability of a network device, and a device, to resolve a packet loss problem caused by lack of an iFIT capability of the network device, thereby improving robustness of network operation.

According to a first aspect, this application provides a method for confirming an iFIT capability. The method includes: A first network device receives a confirmation packet, where the confirmation packet includes confirmation information about whether a second network device has an iFIT capability.

The first network device such as a head node receives the confirmation packet used to confirm whether the second network device such as a path node or an end node has the iFIT capability, so that the first network device can send a data packet including iFIT information to the second network device when confirming that the second network device has the iFIT capability, to avoid a packet loss problem caused by a failure to remove the iFIT information due to lack of the iFIT capability of the network device.

In an optional design, the method includes: The first network device sends a request packet, where the request packet is used to request to confirm whether the second network device has the iFIT capability; and that a first network device receives a confirmation packet includes: The first network device receives the confirmation packet in response to the request packet.

In an optional design, that the first network device sends a request packet includes: The first network device sends the request packet to the second network device; and that the first network device receives the confirmation packet in response to the request packet includes: The first network device receives the confirmation packet from the second network device.

In an optional design, the request packet is an Internet control message protocol ICMP packet, the request packet includes request information used to request to confirm the iFIT capability of the second network device, the request information is carried in type and code fields of the request packet, the confirmation packet is an ICMP packet, and the confirmation information in the confirmation packet is carried in type and code fields of the confirmation packet.

By extending the ICMP packet, an ICMP packet mechanism can be flexibly applied, and the iFIT capability of the network device can be quickly confirmed, to improve robustness and efficiency of network operation.

In an optional design, that the first network device sends a request packet includes: The first network device sends the request packet to a network management device; and that the first network device receives the confirmation packet in response to the request packet includes: The first network device receives the confirmation packet from the network management device.

By using management and control capabilities of the network management device over the network device, whether the network device has the iFIT capability can be flexibly learned and confirmed to improve robustness and efficiency of network operation.

In an optional design, the first network device sends a data packet including iFIT information to the second network device in response to that the second network device has the iFIT capability.

In an optional design, the first network device sends the data packet including the iFIT information to the second network device in response to that the second network device has the iFIT capability and a ratio of network devices having the iFIT capability on a path from the first network device to the second network device is greater than a preset value.

Before sending the data packet including the iFIT information, the first network device first collects statistics on the ratio of nodes supporting the iFIT capability on a transmission path of the data packet, and sends the data packet when the ratio is greater than the preset value. In this way, assessment is performed on necessity of iFIT, to ensure accuracy of an iFIT result to some extent.

According to a second aspect, this application provides a method for confirming an iFIT capability. The method includes: A second network device receives a request packet of a first network device, where the request packet is used to request to confirm an iFIT capability of the second network device; and the second network device sends a confirmation packet, where the confirmation packet includes confirmation information about whether the second network device has the iFIT capability.

The first network device receives the confirmation packet from the second network device such as a path node or an end node, so that the first network device can send a data packet including iFIT information to the second network device when confirming that the second network device has the iFIT capability, to avoid a packet loss problem caused by a failure to remove the iFIT information due to lack of the iFIT capability of the network device.

In a possible design, the request packet is an Internet control message protocol ICMP packet, the request packet includes request information used to request to confirm the iFIT capability of the second network device, the request information is carried in type and code fields of the request packet, the confirmation packet is an ICMP packet, and the confirmation information in the confirmation packet is carried in type and code fields of the confirmation packet.

According to a third aspect, this application provides a method for confirming an iFIT capability. The method includes: A network management device generates a confirmation packet, where the confirmation packet includes confirmation information about whether a second network device has an iFIT capability; and the network management device sends the confirmation packet to a first network device.

The network management device may actively send the acquired iFIT capability of a network node in an iFIT network to the first network device, and the first network device does not need to first send the request packet, to simplify a communication process and improve communication efficiency while avoiding a packet loss.

In a possible design, the method includes: The network management device receives a request packet of the first network device, where the request packet is used to request to confirm the iFIT capability of the second network device; and that the network management device sends the confirmation packet to a first network device includes: The network management device sends the confirmation packet in response to the request packet to the first network device.

In a possible design, the confirmation packet further includes a device identifier of the second network device, and the device identifier is used to identify a correspondence between the confirmation information and the second network device.

The network management device adds the device identifier to the confirmation packet. In this way, the network management device can notify the first network device of the second network device to which the confirmation information in the confirmation packet belongs, so that the first network device can obtain the iFIT capability of each network device on a transmission path of a data packet.

According to a fourth aspect, this application provides a first network device. The device includes a receiving unit, configured to receive a confirmation packet, where the confirmation packet includes confirmation information about whether a second network device has an iFIT capability.

In a possible design, the first network device further includes a sending unit, configured to send a request packet, where the request packet is used to request to confirm whether the second network device has the iFIT capability, where the receiving unit receives the confirmation packet, including: receiving the confirmation packet in response to the request packet.

In a possible design, the sending unit sends the request packet, including: the first network device sends the request packet to the second network device; and the receiving unit receives the confirmation packet in response to the request packet, including: the first network device receives the confirmation packet from the second network device.

In a possible design, the request packet is an Internet control message protocol ICMP packet, the request packet includes request information used to request to confirm the iFIT capability of the second network device, the request information is carried in type and code fields of the request packet, the confirmation packet is an ICMP packet, and the confirmation information in the confirmation packet is carried in type and code fields of the confirmation packet.

In a possible design, the sending unit sends the request packet, including: the first network device sends the request packet to a network management device; and the receiving unit receives the confirmation packet in response to the request packet, including: the first network device receives the confirmation packet from the network management device.

In a possible design, the first network device further includes a response unit, configured to send a data packet including iFIT information to the second network device in response to that the second network device has the iFIT capability.

In a possible design, the first network device sends the data packet including the iFIT information to the second network device in response to that the second network device has the iFIT capability and a ratio of network devices having the iFIT capability on a path from the first network device to the second network device is greater than a preset value.

According to a fifth aspect, this application provides a second network device. The second network device includes: a receiving unit, configured to receive a request packet of a first network device, where the request packet is used to request to confirm an iFIT capability of the second network device; and a sending unit, configured to send a confirmation packet, where the confirmation packet includes confirmation information about whether the second network device has the iFIT capability.

In a possible design, the request packet is an Internet control message protocol ICMP packet, the request packet includes request information used to request to confirm the iFIT capability of the second network device, the request information is carried in type and code fields of the request packet, the confirmation packet is an ICMP packet, and the confirmation information in the confirmation packet is carried in type and code fields of the confirmation packet.

According to a sixth aspect, this application provides a network management device. The network management device includes: a generation unit, configured to generate a confirmation packet, where the confirmation packet includes confirmation information about whether a second network device has an iFIT capability; and a sending unit, configured to send the confirmation packet to a first network device.

In a possible design, the network management device further includes: a receiving unit, configured to receive a request packet of the first network device, where the request packet is used to request to confirm the iFIT capability of the second network device, where the sending unit sends the confirmation packet to the first network device, including: sending the confirmation packet in response to the request packet to the first network device.

In a possible design, the confirmation packet further includes a device identifier of the second network device, and the device identifier is used to identify a correspondence between the confirmation information and the second network device.

According to a seventh aspect, an embodiment of this application provides a network device. The device includes a processor and a memory. The memory is configured to store a computer program. The processor is configured to invoke the computer program stored in the memory to execute the corresponding method in the first aspect, the second aspect, or the third aspect.

BRIEF DESCRIPTION OF THE DRAWINGS

To describe technical solutions in embodiments of this application more clearly, the following briefly describes accompanying drawings for describing the embodiments.

DETAILED DESCRIPTION OF ILLUSTRATIVE EMBODIMENTS

Figures 1, 2:
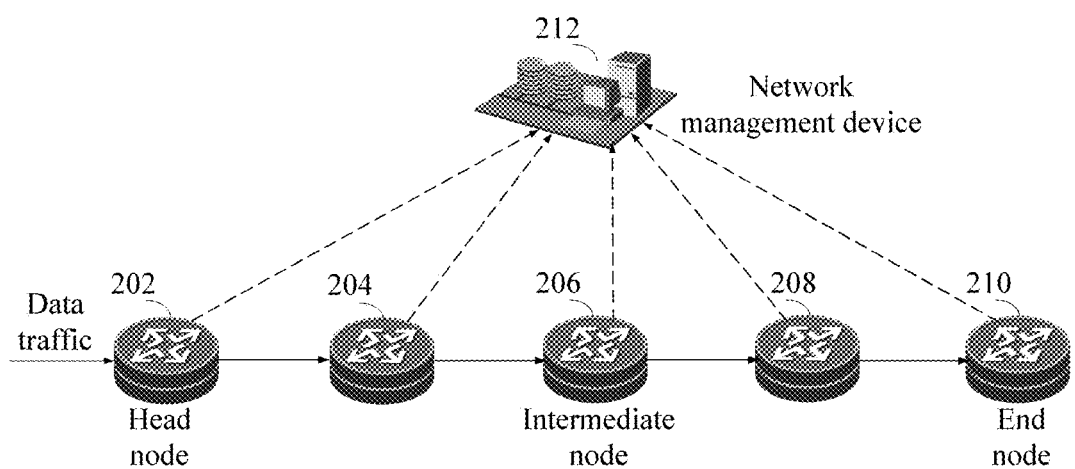
FIG. 1 is a schematic diagram of a structure of an iFIT network according to an embodiment of this application.
FIG. 2 is a schematic diagram of a structure of an ICMP packet according to an embodiment of this application.

The following describes technical solutions in embodiments in this application with reference to accompanying drawings. A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

An in-situ flow information telemetry (iFIT) technology may use a dedicated iFIT header to perform feature marking on a data packet flowing through a network node, where the feature marking may also be referred to as coloring. For example, the iFIT header may be used as an extension header of the multi-protocol label switching (MPLS) protocol, and the like. A network supporting the iFIT technology usually includes three types of network nodes. Using a network structure shown in FIG. 1 as an example, the three types of network nodes are respectively a head node 202, hop-by-hop path nodes 204, 206, and 208, and an end node 210. For a network node having an iFIT capability, when the data packet flows through the network node, the network node can measure statistical data such as a packet loss and a delay of a feature field of the data packet based on corresponding field information in the iFIT header, and sends the statistical data obtained through measurement to a network management device 212, so that the network management device 212 further calculates a network delay, a packet loss status, a restoration path, and the like.

When end-to-end telemetry is performed on the data packet in the network by using the iFIT technology, the head node first determines whether a data stream including the data packet is in a data stream on which telemetry needs to be performed. For example, a feature of the data flow on which telemetry needs to be performed may be added to an access control list (ACL). If the data packet hits a rule in the ACL and the rule indicates that iFIT needs to be performed, a corresponding operation is performed on the data packet. Still using FIG. 1 as an example, after the data packet hits the ACL, the head node 202 encapsulates iFIT information into the data packet, and then sends the data packet into which the iFIT information is encapsulated. The data packet flows through the path nodes 204, 206, and 208 in sequence, and reaches the end node 210. When the data packet is sent to the end node 210, the end node 210 may remove the iFIT information of the data packet, to forward the original data packet. However, in an actual application scenario, the end node 210 may not have the iFIT capability, and therefore cannot smoothly remove the iFIT information. Consequently, the data packet is discarded because it cannot be identified.

To resolve the foregoing possible technical problem, an embodiment of this application provides a method 300 for confirming an iFIT capability of a network node. When the method 300 is performed, a head node can confirm, before encapsulating iFIT information, whether an end node has an iFIT capability. When the end node does not have the iFIT capability, the head node does not encapsulate an iFIT header. In this case, although iFIT cannot be smoothly performed, a packet loss of the end node is not caused.

S305. A first network device sends a request packet to a second network device, where the request packet includes request information used to request to confirm whether the second network device has the iFIT capability.

A format of the request packet is described by using an implementation based on the Internet control message protocol (ICMP) as an example. FIG. 2 shows a structure of an ICMP packet including an ICMP header. The ICMP header includes type, code, and checksum subfields. The type field is used to describe a function and a format of the ICMP packet, the code field is used to describe a type of the ICMP packet, the checksum field is used to ensure integrity of data reception, and the type field and the code field may cooperate to identify the function and the type of the ICMP packet.

The first network device serving as a request initiator may send an ICMP iFIT capability request packet to the second network device serving as a request receiver. The ICMP iFIT capability request packet includes request information used to request the iFIT capability, and the request information is used to identify that the request packet is used to confirm the iFIT capability. For example, considering that Type=15 and Code=0 used as field values in an initially defined information request packet are already abandoned in use, Type=15 and Code=0 may be redefined as field values in the ICMP iFIT capability request packet. The type and code fields in the request packet and respective specified values: Type=15 and Code=0 are used as the request information. Alternatively, a value of another reserved type in the ICMP packet may be used as a corresponding value of the iFIT capability request information, and a value of code used together is defined, to identify that the request packet is a packet requesting the iFIT capability. The first network device sends the ICMP iFIT capability request packet to the second network device.

S310. The second network device receives the request packet sent by the first network device, and sends a corresponding response packet to the first network device based on the request packet, where the response packet includes response information used to confirm whether the second network device has the iFIT capability.

Using the implementation based on the ICMP as an example, the second network device receives the ICMP iFIT capability request packet, and confirms, based on the value of the iFIT capability request information carried in the request packet, that the currently received request packet is used to request to obtain a local iFIT capability status. The second network device sends a corresponding ICMP iFIT capability response packet to the first network device, where the response packet is used to respond to whether the second network device has the iFIT capability. The ICMP iFIT capability response packet includes iFIT capability response information, where the response information is used to identify the iFIT capability of the second network device. In a specific implementation, considering that Type=16 and Code=0 used used as field values in an initially defined information request packet are already abandoned in use, Type=16 and Code=0 or Code=1 may be redefined as field values in the ICMP iFIT capability response packet. The type and code fields in the request packet and respective specified values: Type=16 and Code=0 or Code=1 are used as the iFIT capability response information. Code=0 represents that the second network device has the iFIT capability, and Code=1 represents that the second network device does not have the iFIT capability. In another specific implementation, a value of another reserved type in the ICMP packet may alternatively be used as a corresponding value of the iFIT capability response information, and a value of code used together is defined, to identify that the response packet is an iFIT capability response packet.

Generally, to return a correct ICMP iFIT capability response packet, the second network device needs to support at least an ICMP iFIT capability request and response rule. For example, the second network device supports the rule, and has the iFIT capability. In this case, the second network device may return an iFIT capability response packet with information values that can identify that the second network device has the iFIT capability. For example, the information values are Type=16 and Code=0. In another example, in some cases, for example, the second network device is waiting for iFIT configuration, deployment, and the like, the second network device does not have the iFIT capability at present, but can support and understand the rule. In this case, the second network device may return the iFIT capability response packet with information values that can identify that the second network device does not have the iFIT capability. For example, the information values are Type=16 and Code=1. The second network device sends the generated ICMP iFIT capability response packet to the first network device. The first network device receives the ICMP iFIT capability response packet.

S315. The first network device receives the response packet, and determines, based on the response information in the response packet, whether the second network device has the iFIT capability.

After receiving the ICMP iFIT capability response packet, the first network device determines, based on the value of the iFIT capability response information in the response packet, whether the second network device has the iFIT capability. For example, in an implementation in which the type and code fields are used the iFIT capability response information, the first network device confirms, based on Type=16 and Code=0, that the second network device has the iFIT capability, or the first network device determines, based on Type=16 and Code=1, that the second network device does not have the iFIT capability.

In some cases, the second network device may not support the ICMP iFIT capability request and response rule. For example, the second network device does not support iFIT deployment at all, or supports only iFIT deployment of an old version, but does not know the newly defined ICMP iFIT capability request and response rule, and other cases. The second network device may fail to smoothly return the ICMP iFIT capability response packet, but discard the request packet or does not respond to the request packet after receiving the ICMP iFIT capability request packet sent by the first network device, or although the second network device responds to the request packet, the response packet is an error packet, or the like. Therefore, in some possible embodiments, when finding that the second network device does not respond to the request packet or the response packet is an error packet, the first network device determines that the second network device does not have the iFIT capability.

In some embodiments, the request packet sent by the first network device to the second network device, and the response packet returned by the second network device to the first network device may alternatively be implemented based on another protocol type, for example, may be packets of a user datagram protocol (UDP) protocol family or a transmission control protocol (TCP) protocol family. Specific manners of setting the iFIT capability request information used to identify that the request packet is the iFIT capability request packet and the iFIT capability response information used to identify that the response packet is the iFIT capability response packet may be specifically determined based on a definition of a protocol packet.

Figure 3:
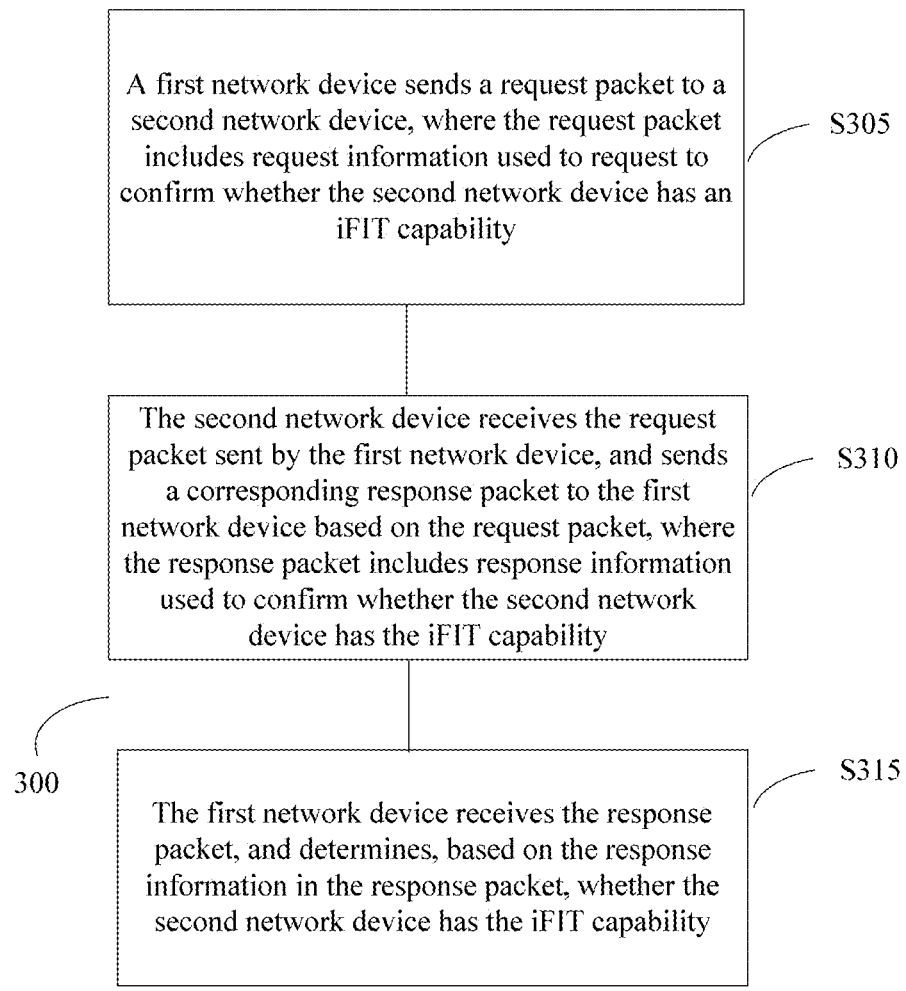
FIG. 3 is a schematic flowchart of a method for confirming an iFIT capability according to an embodiment of this application.

In a possible implementation, although not shown in FIG. 3, the method 300 further includes the following step.

The first network device confirms that the second network device has the iFIT capability, and sends a data packet into which iFIT information is encapsulated to the second network device.

When confirming that the second network device has the iFIT capability, the first network device sends, to the second network device, the data packet that includes the iFIT information and that needs to be sent. When confirming that the second network device does not have the iFIT capability, the first network device does not send the data packet, to avoid the data packet from being discarded due to a failure to be identified after an iFIT header is encapsulated into the data packet.

In some embodiments, the first network device is a head node in an iFIT network, and the second network device is an end node in the iFIT network, for example, the head node 202 and the end node 210 shown in FIG. 1. By performing the method 200, it can be ensured that the data packet that includes the iFIT information and that is sent at the head node can be received at the end node after the iFIT information is smoothly removed, and is not discarded at the end node. In some other embodiments, the second network device may alternatively be a path node in the iFIT network, for example, the path node 204, 206, or 208 in FIG. 1. In this way, the method 200 is performed to query the iFIT capability of the path node. In some cases, the query for the iFIT capability of the path node may be performed for one or more specified path nodes. In this case, this is similar to a manner of querying the iFIT capability of the end node. For example, an IP address of a corresponding node may be specified in an outer packet carrying the ICMP iFIT capability request packet, to send the ICMP iFIT capability request packet to the specified path node, or the like. In some other cases, during the query for the iFIT capability of the path node, all the hop-by-hop path nodes and the end node may be traversed. For this purpose, for example, a traceroute command may be multiplexed. In an existing definition, the traceroute command can be used to traverse all the path nodes and the end node on a transmission path of the data packet, and each path node can return the ICMP iFIT capability response packet based on the traceroute command. By multiplexing and redefining the command, all the path nodes and the end node that receive the command can be enabled to return respective iFIT capability statuses, and the like. Alternatively, the head node may execute the traceroute command to obtain all the path nodes and the end node that are traversed on the transmission path of the data packet, and then send the iFIT capability request packet to each of all the path nodes and the end node, to obtain a response packet of each corresponding node to determine an iFIT capability status of the node, or the like.

It can be learned with reference to FIG. 1 that, in an actual iFIT network application scenario, each network node through which the data packet flows may send its own configuration information, iFIT information, and the like to the network management device 212 by using, for example, the extensible markup language (XML) based network configuration protocol (NETCONF), and the like. Another embodiment of this application further provides a method 400 for confirming an iFIT capability based on a network management device. In the method 400, an iFIT capability of a network node in an iFIT network is acquired by using the network management device, and iFIT capability information of the corresponding network node is provided for a first network device such as a head node based on a requirement. The method 400 specifically includes the following content.

S405. The first network device sends a request packet to the network management device, where the request packet is used to confirm whether a second network device has the iFIT capability, the request packet includes iFIT capability request information, and the iFIT capability request information is used to identify that the request packet is used to confirm the iFIT capability.

A format of the request packet is described by using an implementation based on the NETCONF protocol as an example. The NETCONF protocol provides a mechanism for managing a network device. A user may use this mechanism to obtain configuration information and status information of the managed network device by using the network management device. In this embodiment, the first network device serving as a request initiator may send an NETCONF protocol based iFIT capability request packet to the network management device serving as a request receiver, where the iFIT capability request packet includes the iFIT capability request information, and the iFIT capability request information is used to identify that the request packet is used to confirm the iFIT capability. In a specific implementation, for example, the first network device may be the head node 202 in FIG. 1, and the network management device, for example, may be the network management device 212 in FIG. 1. The head node 202 sends the request packet to the network management device 212, to request to confirm whether an end node 210 has the iFIT capability. The request packet includes the iFIT capability request information, to identify that the request packet is used to confirm the iFIT capability. The request packet may further include device identifier information, used to identify that the iFIT capability confirmation is requested for the specified second network device. In another possible embodiment, the device identifier information allows specifying a plurality of network devices, to be specific, allows requesting to query iFIT capabilities of a plurality of network devices at the same time. However, for a case in which the second network device is the end node or another specific node in the iFIT network by default, for example, when iFIT is performed on a point-to-point unicast data packet, the data identifier information may alternatively not be included. The network management device may directly return iFIT capability confirmation information of a corresponding default second network device based on the first network device that initiates the request.

S410. The network management device receives the request packet sent by the first network device, and sends a response packet to the first network device based on the request packet, where the response packet includes response information used to confirm whether the second network device has the iFIT capability.

In a possible embodiment, after receiving the request packet sent by the head node 202, the network management device 212 matches and determines the end node 210 corresponding to the head node 202 based on information such as a device identifier of the head node 202 and topological structure information of the network. Then, the network management device 212 queries and confirms whether the end node 210 has the iFIT capability. In another possible embodiment, alternatively, after receiving the request packet, the network management device 212 may determine, based on the device identifier information in the request packet, the second network device whose iFIT capability is requested by the head node 202. In another possible embodiment, when the device identifier information specifies a plurality of specific network devices, after receiving the request packet, the network management device 212 may alternatively determine that the head node 202 requests to obtain iFIT capabilities of the plurality of specific network devices.

The network management device 212 obtains the iFIT capability of the second network device or the iFIT capabilities of the plurality of specific network devices. A manner in which the network management device 212 obtains the corresponding iFIT capability, for example, may be based on default configuration information sent in advance by each network device, or based on a product adaptive file (PAF). The PAF file is generally used to describe characteristics and capabilities supported by a network device.

After determining the iFIT capability of the corresponding network device, the network management device 212 encapsulates a status of the iFIT capability as iFIT capability response information into the NETCONF protocol based iFIT capability response packet for transmission to the first network device. The first network device receives the response packet sent by the network management device.

S415. The first network device receives the response packet sent by the network management device, and determines, based on the response information in the response packet, whether the second network device has the iFIT capability.

After receiving the iFIT capability response packet sent by the network management device, the first network device may determine, based on a value of the iFIT capability response information in the response packet, whether the second network device has the iFIT capability, or the plurality of specific network devices have the iFIT capabilities.

Figure 4:
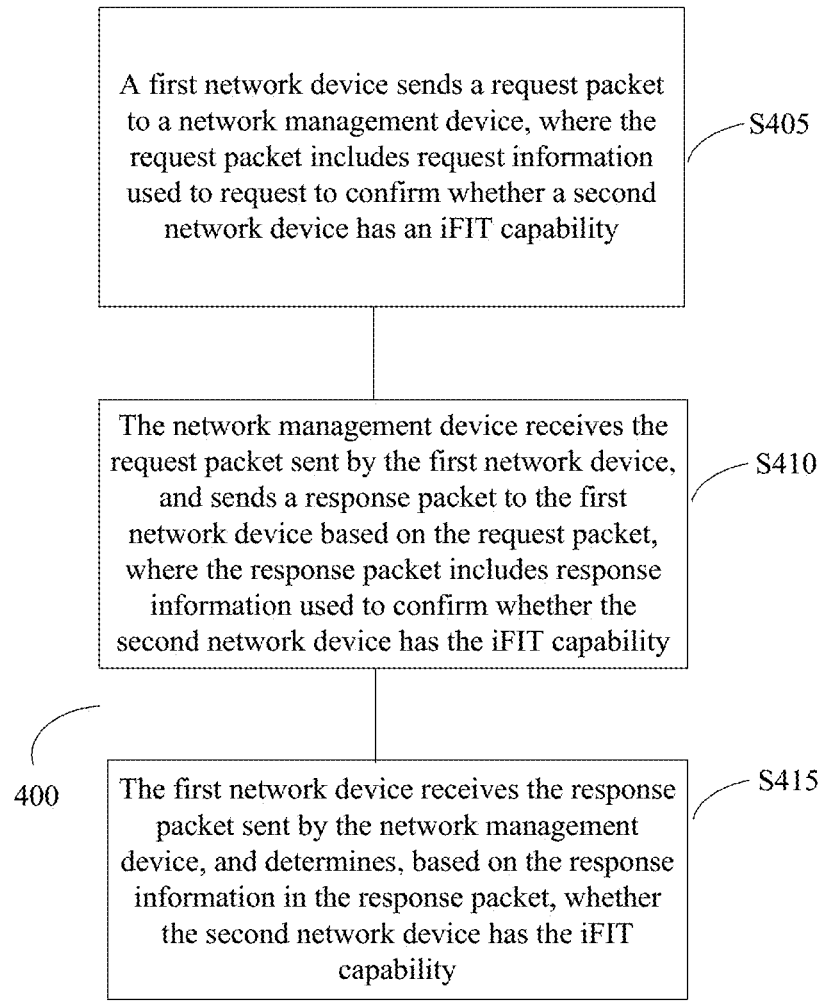
FIG. 4 is a schematic flowchart of a method for confirming an iFIT capability according to an embodiment of this application.

In a possible implementation, although not shown in FIG. 4, the method 400 further includes the following content:

The first network device confirms that the second network device has the iFIT capability, and sends a data packet including iFIT information to the second network device.

In a possible embodiment, when confirming that the second network device has the iFIT capability, the first network device sends, to the second network device, the data packet that includes the iFIT information and that needs to be sent. When confirming that the second network device does not have the iFIT capability, the first network device does not send the data packet, to avoid the data packet from being discarded due to a failure to be identified after the data packet carries the iFIT information. The second network device, for example, may be the end node 210 or any path node 204, 206, or 208 shown in FIG. 1.

For the foregoing method 300 or 400, in another possible implementation, the first network device can obtain iFIT capabilities of all the path nodes and the end node on the path from the first network device to the second network device. The obtaining manner may be direct obtaining implemented by sending the ICMP protocol request packet or another type of communication request packet to the path nodes and the end node, or may be indirect obtaining implemented by sending the NETCONF protocol request packet or another type of management control request packet to the network management device. The first network device, for example, the head node 202 in FIG. 1, may determine a corresponding iFIT policy after obtaining the iFIT capabilities of all the path nodes and the end node. For example, the head node 202 sends the data packet including the iFIT information to the corresponding end node only when determining that all the path nodes and the end node have the iFIT capability, to ensure that no packet is lost in the entire end-to-end transmission process of the data packet. In another example, when determining that the end node does not have the iFIT capability, the head node 202 may determine the last path node having the iFIT capability in the end-to-end transmission process, and indicate the network management device 212 to configure the last path node as a network node from which the iFIT header is to be removed, to ensure that the data packet can be smoothly forwarded on a subsequent network node, and that the data packet is not discarded because the iFIT information is not identified. Alternatively, if the iFIT capability of the network node is obtained from the network management device 212, the network management device 212 may directly determine the last path node having the iFIT capability on the transmission path, and configure the path node as the node from which the iFIT information is to be removed. In another example, in an actual application scenario, in the end-to-end transmission process of the data packet, some network nodes may not have the iFIT capability, but may be used as forwarding nodes to transparently transmit an iFIT packet carrying the data packet. In this way, although the data packet is not discarded due to failures in identifying the iFIT packet by the network nodes, if there is a large proportion of network nodes that transparently transmit only the iFIT packet, accuracy and necessity of an iFIT result are directly affected. Therefore, the head node 202 may first collect statistics on a percentage of path nodes having the iFIT capability to all the path nodes that the data packet flows through in the end-to-end transmission process. Only when the percentage is greater than a specific threshold, the head node 202 determines to encapsulate the iFIT header into the data packet and send the data packet. The network management device 212 may alternatively perform statistics collection on the percentage of the path nodes having the iFIT capability, and notify the head node 202, based on a statistical result, whether to carry the iFIT information for the data packet.

In some embodiments, the first network device may alternatively be a path node in the iFIT network, and the path node may request an iFIT capability of another path node in the network, such as a next-hop path node, and forward the data packet when determining that the next-hop path node has the iFIT capability, to ensure that the forwarding does not result in a packet loss on the next-hop path node.

An embodiment of this application further provides another method 500 for confirming an iFIT capability of a network node. In the method 500, an acquired iFIT capability of a network node in an iFIT network is actively sent to a first network device such as a head node by using a network management device, and the first network device does not need to send an iFIT capability request packet, to simplify a communication process and improve communication efficiency. The method 500 specifically includes the following content.

S505. The network management device generates a confirmation packet, where the confirmation packet includes iFIT capability confirmation information, and the iFIT capability confirmation information is used to confirm whether a second network device has an iFIT capability.

In a possible embodiment, an implementation based on the NETCONF protocol is still used as an example. Different from the method 400, the first network device does not need to actively initiate an iFIT capability request packet to the network management device. Instead, after completing networking and iFIT configuration management of nodes on two ends including a head node 202 and an end node 210, the network management device matches and determines the head node 202 corresponding to the end node 210 based on information such as a device identifier of the end node 210 and topological structure information of the network. The network management device 212 queries and confirms whether the end node 210 has the iFIT capability, and then encapsulates iFIT capability confirmation information used to feed back the iFIT capability into a NETCONF protocol based confirmation packet for transmission to the head node 202. In another possible embodiment, alternatively, the network management device 212 may carry a corresponding device identifier in the confirmation packet by using device identifier information, to determine the network device whose iFIT capability is fed back by the iFIT capability confirmation information. In another possible embodiment, the confirmation packet can feed back iFIT capability confirmation information of a plurality of network devices at the same time. In this case, the confirmation packet also feeds back correspondences between corresponding device identifiers and the iFIT capability confirmation information.

S510. The network management device sends the confirmation packet to the first network device.

S515. The first network device receives the confirmation packet sent by the network management device, and confirms, based on the confirmation information in the confirmation packet, whether the second network device has the iFIT capability.

Figure 5:
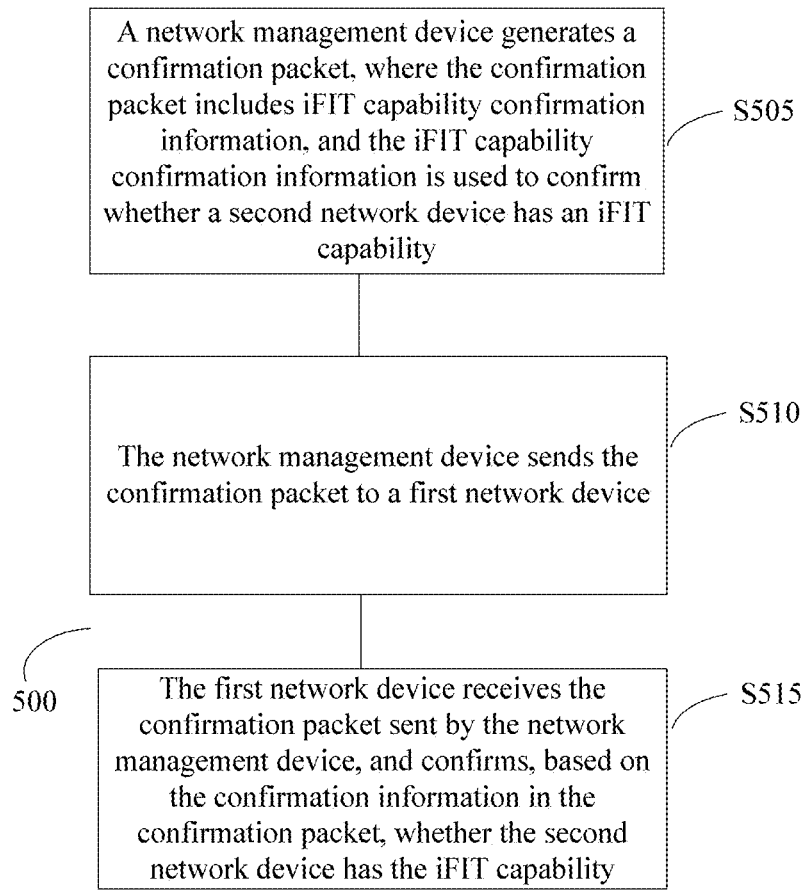
FIG. 5 is a schematic flowchart of a method for confirming an iFIT capability according to an embodiment of this application.
Figure 6:
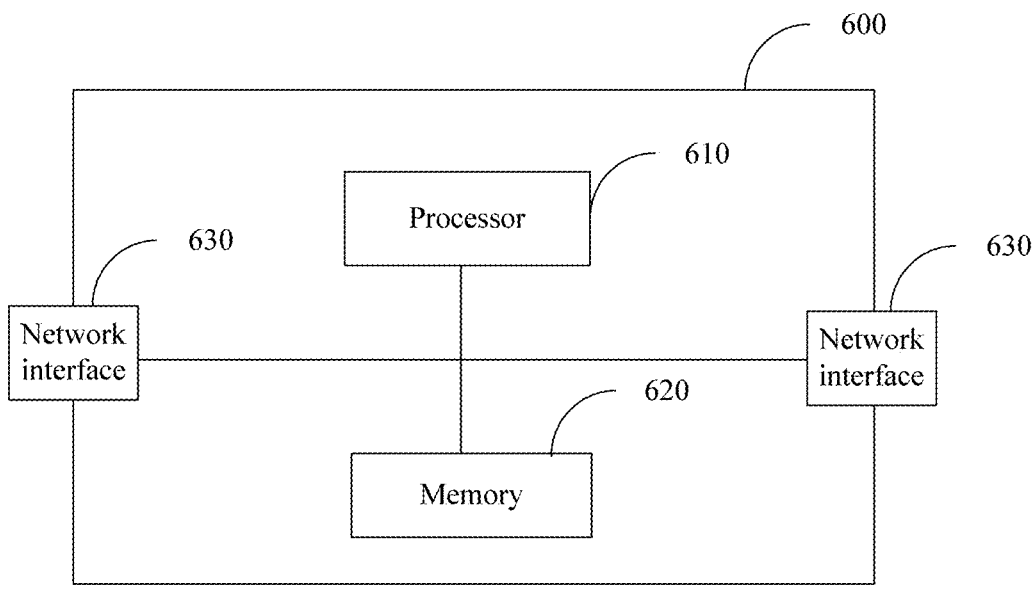
FIG. 6 is a schematic diagram of a structure of a network device according to an embodiment of this application.

In a possible implementation, although not shown in FIG. 5, the method 500 may further includes the following content:

The first network device confirms that the second network device has the iFIT capability, and sends a data packet into which an iFIT header is encapsulated to the second network device.

An embodiment of this application provides a network device 600. The network device 600 includes a processor 610, a memory 620, and a network interface 630. The network interface 630 is configured to: receive a packet from a network and/or send, to the network, a packet that needs to be sent by the network device 600. The network interface 630 may further send the packet received from the network to the memory 620 and the processor 610, or may send, to the network, a packet processed or generated by the processor 610. The memory 620 is configured to store a computer program, and the processor bio is configured to execute the computer program stored in the memory 620, so that the network device 600 performs the corresponding method for confirming an iFIT capability that is performed by the first network device in the foregoing method 300. The network device 600 herein may be, for example, the head node 202 shown in FIG. 1. Alternatively, the network device 600 is enabled to perform the corresponding iFIT capability response method performed by the second network device in the foregoing method 300, or perform the corresponding iFIT capability response method performed by the network management device in the foregoing method 400. The network device 600 herein may be, for example, the end node 210, or may be the path node 204, 206, or 208, or may be the network management device 212 shown in FIG. 1. Alternatively, the network device 600 is enabled to perform the corresponding method for confirming an iFIT capability that is performed by the network management device in the foregoing method 500. The network device 600 herein may be, for example, the network management device 212 shown in FIG. 1.

An embodiment of this application further provides a computer-readable storage medium or a computer program product, configured to store a corresponding computer program. The computer program is configured to separately perform a corresponding method performed by the first network device, the second network device, or the network management device in the foregoing methods 300, 400, and 500.

It should be understood that in this embodiment of this application, the processor may be a central processing unit (CPU), another possible general purpose processor, or the like.

The memory may be a non-volatile random access memory, for example, may include a read-only memory and/or a random access memory, and provide instructions and data for the processor.

In an implementation process, the steps of the foregoing method 300, 400, or 500 may be completed by using an integrated logic circuit of hardware in the processor 610 or instructions in a form of software, or may be completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium may be located in the memory, and the processor reads information in the memory, and correspondingly completes the steps in the foregoing method 300, 400, or 500 in combination with hardware of the processor.

It may be understood that structural composition of the network device 600 is merely a possible example. During actual application, the network device 600 may include any quantity of interfaces, processors, memories, and the like.

It should be understood that sequence numbers of the foregoing processes do not mean an execution sequence in various embodiments of this application. The execution sequence of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps can be implemented by electronic hardware or a combination of computer software and the electronic hardware. Whether the functions are performed by hardware or software depends on particular applications and design constraint conditions of the technical solutions. A person skilled in the art may use different methods to implement the described functions for each specific application.

All or some of the foregoing embodiments may be implemented by using software, hardware, firmware, or any combination thereof. When software or firmware is used to implement the embodiments, all or some of the embodiments may be implemented in a form of a computer program product. The computer program product includes one or more computer instructions. When the computer program instructions are loaded and executed on the computer, the procedure or functions according to the embodiments of this application are completely or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, a twisted pair) or wireless (for example, infrared, or microwave) manner. The computer-readable storage medium may be any medium accessible by a computer, or a data storage device, for example, a server or a data center, integrating one or more media. The medium may be a magnetic medium (for example, a floppy disk, a hard disk drive, or a magnetic tape), an optical medium (for example, an optical disc), a semiconductor medium (for example, a solid-state drive (SSD)), or the like.

All parts in this specification are described in a progressive manner. For same or similar parts in the embodiments, refer to each other. Especially, the device embodiment is basically similar to a method embodiment, and therefore is described briefly. For related parts, refer to descriptions in the method embodiment.

In summary, it should be noted that the foregoing descriptions are merely embodiments of the technical solutions in this application, but are not intended to limit the protection scope of this application.

What is claimed is:

1. A method, comprising:
sending, by a first network device, a request packet, wherein the request packet requests to confirm whether a second network device has an in-situ flow information telemetry (iFIT) capability, the request packet is an Internet control message protocol (ICMP) packet, the request packet comprises request information requesting to confirm the iFIT capability of the second network device, the request information is carried in type and code fields of the request packet, the confirmation packet is an ICMP packet, and the confirmation information in the confirmation packet is carried in type and code fields of the confirmation packet;

receiving, by the first network device, a confirmation packet in response to the request packet, wherein the confirmation packet comprises confirmation information about whether the second network device has the iFIT capability; and sending, by the first network device, a data packet comprising iFIT information to the second network device in response to determining, based on the confirmation packet, that the second network device has the iFIT capability.

2. The method according to claim 1, wherein sending, by the first network device, the request packet comprises:
sending, by the first network device, the request packet to a network management device; and
wherein receiving, by the first network device, the confirmation packet comprises:
receiving, by the first network device, the confirmation packet from the network management device.

3. The method claim 1, wherein sending the request packet comprises sending the request packet to a network management device different from the second network device.

4. The method claim 1, wherein sending the request packet comprises sending the request packet to the second network device.

5. The method claim 1, wherein the second network device is an end node of a data stream.

6. A method, comprising:
receiving, by a network management device, a request packet from a first network device, wherein the request packet requests to confirm whether a second network device has an in-situ flow information telemetry (iFIT) capability, wherein the second network device is different from the network management device, the request packet is an Internet control message protocol (ICMP) packet, the request packet comprises request information requesting to confirm the iFIT capability of the second network device, the request information is carried in type and code fields of the request packet, the confirmation packet is an ICMP packet, and the confirmation information in the confirmation packet is carried in type and code fields of the confirmation packet;
generating, by the network management device, a confirmation packet, wherein the confirmation packet comprises confirmation information about whether the second network device has the iFIT capability; and
sending, by the network management device, the confirmation packet to the first network device in response to receiving the request packet.

7. The method of claim 6, further comprises querying the second network device to determine whether the second network device has the iFIT capability before generating the confirmation packet.

8. The method of claim 6, wherein the second network device is an end node of a data stream.

9. A first network device, comprising:
a non-transitory memory storing instructions; and
a processor coupled to the non-transitory memory, wherein the instructions are executable by the processor to cause the first network device to:
send a request packet, wherein the request packet requests to confirm whether a second network device has an in-situ flow information telemetry (iFIT) capability, the request packet is an Internet control message protocol (ICMP) packet, the request packet comprises request information requesting to confirm the iFIT capability of the second network device, the request information is carried in type and code fields of the request packet, the confirmation packet is an ICMP packet, and the confirmation information in the confirmation packet is carried in type and code fields of the confirmation packet;
receive a confirmation packet in response to the request packet, wherein the confirmation packet comprises confirmation information about whether the second network device has the iFIT capability; and
send a data packet comprising iFIT information to the second network device in response to determining, based on the confirmation packet, that the second network device has the iFIT capability.

10. The first network device according to claim 9, wherein the instructions are further executable by the processor to cause the first network device to:
send a data packet free of any iFIT information to the second network device in response to determining, based on the confirmation packet, that the second network device does not have the iFIT capability.

11. The first network device according to claim 9, wherein the instructions are further executable by the processor to cause the first network device to:
determine whether a data stream including a data packet to be sent to the second network device is in the data stream on which telemetry needs to be performed.

12. The first network device according to claim 9, wherein the second network device is an end node of a data stream.

13. The first network device according to claim 9, wherein the instructions are executable by the processor to further cause the first network device to send the request packet to a network management device different from the second network device.

14. The first network device according to claim 9, wherein the instructions are executable by the processor to further cause the first network device to send the request packet to the second network device.

15. A network management device, comprising:
a non-transitory memory storing instructions; and
a processor coupled to the non-transitory memory, wherein the instructions are executable by the processor to cause the network management device to:
receive a request packet from a first network device, wherein the request packet requests to confirm whether a second network device has an in-situ flow information telemetry (iFIT) capability, wherein the second network device is different from the network management device, the request packet is an Internet control message protocol (ICMP) packet, the request packet comprises request information requesting to confirm the iFIT capability of the second network device, the request information is carried in type and code fields of the request packet, the confirmation packet is an ICMP packet, and the confirmation information in the confirmation packet is carried in type and code fields of the confirmation packet;
generate a confirmation packet, wherein the confirmation packet comprises confirmation information about whether the second network device has in-situ flow information telemetry (iFIT) capability; and
send the confirmation packet to the first network device in response to the receiving the request packet.

16. The network management device according to claim 15, wherein the second network device is an end node of a data stream.

17. The network management device according to claim 15, wherein the instructions are executable by the processor to further cause the network management device to query the second network device to determine whether the second network device has the iFIT capability before generating the confirmation packet.

* * * * *

UNITED STATES PATENT AND TRADEMARK OFFICE
CERTIFICATE OF CORRECTION

PATENT NO. : 12,166,653 B2  
APPLICATION NO. : 17/720864  
DATED : December 10, 2024  
INVENTOR(S) : Ji et al.

Page 1 of 1

It is certified that error appears in the above-identified patent and that said Letters Patent is hereby corrected as shown below:

In the Claims

In Column 15, in Claim 3, Line 23, after "method" insert -- of --.

In Column 15, in Claim 4, Line 27, after "method" insert -- of --.

In Column 15, in Claim 5, Line 30, after "method" insert -- of --.

Signed and Sealed this  
Fourth Day of February, 2025

Coke Morgan Stewart  
*Acting Director of the United States Patent and Trademark Office*